United States Patent
Gao et al.

(10) Patent No.: US 11,475,084 B2
(45) Date of Patent: Oct. 18, 2022

(54) MACHINE LEARNING DRIVEN DYNAMIC NOTIFICATION CONTENT

(71) Applicant: Microsoft Technology Licensing, LLC, Redmond, WA (US)

(72) Inventors: Yan Gao, Los Altos, CA (US); Ajith Muralidharan, Sunnyvale, CA (US); Pratik Daga, Sunnyvale, CA (US); Sandor Nyako, Sunnyvale, CA (US); Nirav Nalinbhai Shingala, Santa Clara, CA (US); Matthew H. Walker, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 664 days.

(21) Appl. No.: 16/454,622

(22) Filed: Jun. 27, 2019

(65) Prior Publication Data

US 2020/0410018 A1 Dec. 31, 2020

(51) Int. Cl.
*G06N 20/00* (2019.01)
*G06F 16/9535* (2019.01)
(Continued)

(52) U.S. Cl.
CPC ....... *G06F 16/9535* (2019.01); *G06K 9/6256* (2013.01); *G06N 20/00* (2019.01); *G06Q 50/01* (2013.01)

(58) Field of Classification Search
CPC ..... G06N 20/00–20; G06K 9/00–6298; G06Q 30/0241–0277; G06Q 50/01; G06F 16/335; G06F 16/435; G06F 16/535; G06F 16/635; G06F 16/735; G06F 16/9035; G06F 16/9535
See application file for complete search history.

(56) References Cited

U.S. PATENT DOCUMENTS 8,856,248 B2 * 10/2014 Chen ............ H04L 51/32
709/204
8,924,493 B1 * 12/2014 Yeskel ............ G06Q 50/01
709/219

(Continued)

*Primary Examiner* — Glenton B Burgess
*Assistant Examiner* — Julian Chang
(74) *Attorney, Agent, or Firm* — Nicholson De Vos Webster & Elliott LLP

(57) ABSTRACT

Technologies for generating dynamic notification content for notification messages using a machine learned model are provided. The disclosed techniques include identifying an event related to a particular user, where the event has a particular notification type that represents a subject type of the event. Based on the particular notification type of the event, a set of candidate headline and call-to-action combinations corresponding to the particular notification type are identified. Using the machine learned model, scores are calculated for each headline and call-to-action combination in the set of candidate headline and call-to-action combinations. One or more particular headline and call-to-action combinations from the set of candidate headline and call-to-action combinations are selected based upon the scores calculated for each combination of the set of candidate headline and call-to-action combinations. A notification message is generated for the event that includes the one or more particular headline and call-to-action combinations selected.

20 Claims, 4 Drawing Sheets

(51) Int. Cl.
 G06K 9/62 (2022.01)
 G06Q 50/00 (2012.01)

(56) References Cited

U.S. PATENT DOCUMENTS

| | | | | |
|---|---|---|---|---|
| 9,146,656 | B1* | 9/2015 | Srinivasan | G06F 3/04842 |
| 9,552,560 | B1* | 1/2017 | Tomkins | G06Q 50/01 |
| 9,706,398 | B2* | 7/2017 | Frederick | H04L 51/32 |
| 9,717,000 | B2* | 7/2017 | Frederick | H04L 67/22 |
| 9,763,090 | B2* | 9/2017 | Frederick | H04L 51/32 |
| 9,883,389 | B2* | 1/2018 | Frederick | G06Q 10/10 |
| 10,277,550 | B2* | 4/2019 | Chen | G06Q 50/01 |
| 10,397,163 | B2* | 8/2019 | Carbune | H04L 51/24 |
| 10,397,169 | B2* | 8/2019 | Sa | H04L 67/22 |
| 10,419,234 | B2* | 9/2019 | Ilic | H04L 51/32 |
| 10,558,714 | B2* | 2/2020 | Guo | G06F 16/951 |
| 10,620,920 | B2* | 4/2020 | Hills | G06F 9/451 |
| 10,621,535 | B1* | 4/2020 | Lawrence | G06Q 10/06393 |
| 10,764,229 | B2* | 9/2020 | Chou | H04L 51/32 |
| 10,846,612 | B2* | 11/2020 | Keysers | G06N 5/04 |
| 11,062,401 | B1* | 7/2021 | Zhao | G06N 20/00 |
| 2003/0055829 | A1* | 3/2003 | Kambo | G06F 9/542 |
| 2006/0047600 | A1* | 3/2006 | Bodenheim | G06Q 20/102 705/40 |
| 2007/0074219 | A1* | 3/2007 | Ginsberg | G06F 9/4825 718/102 |
| 2013/0198282 | A1* | 8/2013 | Lee | G06Q 50/01 709/204 |
| 2013/0268591 | A1* | 10/2013 | Chen | G06Q 50/01 709/204 |
| 2014/0171028 | A1* | 6/2014 | Frederick | H04W 4/14 455/411 |
| 2014/0171035 | A1* | 6/2014 | Frederick | G06Q 50/01 455/414.1 |
| 2014/0172992 | A1* | 6/2014 | Frederick | G06Q 50/01 709/204 |
| 2014/0172995 | A1* | 6/2014 | Deeter | H04L 51/12 709/206 |
| 2014/0173002 | A1* | 6/2014 | Frederick | G06Q 50/01 709/206 |
| 2014/0173509 | A1* | 6/2014 | Wu | G06F 3/04842 715/800 |
| 2014/0372535 | A1* | 12/2014 | Chen | G06Q 50/01 709/204 |
| 2015/0100377 | A1* | 4/2015 | Penumaka | G06Q 30/0201 705/7.29 |
| 2015/0193888 | A1* | 7/2015 | Sayed | H04L 67/306 705/319 |
| 2015/0213372 | A1* | 7/2015 | Shah | G06Q 10/107 706/12 |
| 2015/0220492 | A1* | 8/2015 | Simeonov | G06F 16/972 715/244 |
| 2015/0227967 | A1* | 8/2015 | Knight | G06Q 30/0246 705/14.45 |
| 2015/0332313 | A1* | 11/2015 | Slotwiner | G06Q 30/0242 705/14.44 |
| 2015/0350350 | A1* | 12/2015 | Vijay | H04L 67/18 709/204 |
| 2015/0381552 | A1* | 12/2015 | Vijay | H04L 43/08 709/206 |
| 2016/0004410 | A1* | 1/2016 | Srinivasan | G06F 3/0482 715/810 |
| 2016/0127297 | A1* | 5/2016 | Irmak | H04L 51/32 709/206 |
| 2016/0275193 | A1* | 9/2016 | Abrams | G06Q 10/101 |
| 2016/0277485 | A1* | 9/2016 | Abrams | H04L 51/046 |
| 2016/0379314 | A1* | 12/2016 | Trudeau | G06Q 50/01 705/319 |
| 2017/0140376 | A1* | 5/2017 | Carraway | H04L 67/20 |
| 2017/0185650 | A1* | 6/2017 | Vainas | G06F 16/24575 |
| 2017/0257448 | A1* | 9/2017 | Balasubramaniam | G06Q 50/01 |
| 2017/0337045 | A1* | 11/2017 | Hills | H04L 51/046 |
| 2017/0344620 | A1* | 11/2017 | Modarresi | G06K 9/6249 |
| 2018/0040019 | A1* | 2/2018 | Gavlovski | G06Q 30/0277 |
| 2018/0040029 | A1* | 2/2018 | Zeng | G06Q 30/0277 |
| 2018/0060749 | A1* | 3/2018 | Yan | G06Q 50/01 |
| 2018/0063062 | A1* | 3/2018 | Burdakov | H04L 51/32 |
| 2018/0097769 | A1* | 4/2018 | Sa | H04L 51/32 |
| 2018/0114279 | A1* | 4/2018 | Abrams | H04L 67/12 |
| 2018/0131655 | A1* | 5/2018 | Carbune | G06Q 50/01 |
| 2018/0189822 | A1* | 7/2018 | Kulkarni | G06Q 30/0269 |
| 2018/0225588 | A1* | 8/2018 | Khidekel | G06N 7/005 |
| 2018/0248834 | A1* | 8/2018 | Pan | H04L 67/20 |
| 2018/0337798 | A1* | 11/2018 | Ilic | H04L 51/063 |
| 2019/0138653 | A1* | 5/2019 | Roller | G06F 40/194 |
| 2019/0166213 | A1* | 5/2019 | Hobson | G06Q 50/01 |
| 2019/0205901 | A1* | 7/2019 | Zhang | G06N 20/00 |
| 2019/0392487 | A1* | 12/2019 | Duke | G06N 3/08 |
| 2020/0005116 | A1* | 1/2020 | Kuo | H04L 67/2842 |
| 2020/0034874 | A1* | 1/2020 | Narayan | G06Q 30/0277 |
| 2020/0167832 | A1* | 5/2020 | Pinel | G06T 11/40 |
| 2020/0193483 | A1* | 6/2020 | Lee | H04L 67/22 |
| 2020/0210880 | A1* | 7/2020 | Kuo | G06N 20/00 |

* cited by examiner

MACHINE LEARNING DRIVEN DYNAMIC NOTIFICATION CONTENT

TECHNICAL FIELD

The present disclosure relates to machine learned optimization for selection of notification content for a notification message for a recipient user.

BACKGROUND

Content management systems are designed to provide content items to users for consumption. Content items may represent content such as photos, video, job posts, news articles, documents, user posts, audio, and many more. Content management systems may implement notification systems to generate and send notifications to recipients informing the recipients of pending content items for consumption about events or actions performed by other users that may be of interest to the recipients. For example, a first user, which has a connection to a second user, may publish or share a content item. The notification systems may identify that the second user may be interested in the content item published or shared by the first user and send a notification message to the second user. Upon receiving the notification message, the second user may initiate a user session in order to interact with the content item published or shared by the first user.

Recipients of notification messages may be more likely to interact with the content management system based upon the notification content of a notification message. Determining notification content for notifications messages may be based on a performance objective of increasing user engagement, such as increasing click through rates or increasing the duration of subsequent user sessions. However, conventional notification systems may optimize notification content uniformly for all recipients. Uniform optimization may be beneficial for some users but not others because user engagement preferences may vary depending on a user's likes and dislikes. Conventional notification systems may further optimize the notification content of notification messages by performing several online experiments that vary notification content parameters, such as performing various A/B tests varying one or more optimization parameters. However, A/B test approaches often require extensive time and resources to test and observe user response for each modified optimization parameter. Additionally, applied modifications to optimization parameters may still suffer from a one-size fits all approach, where user engagement from some users may improve but user engagement for other users may decline.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
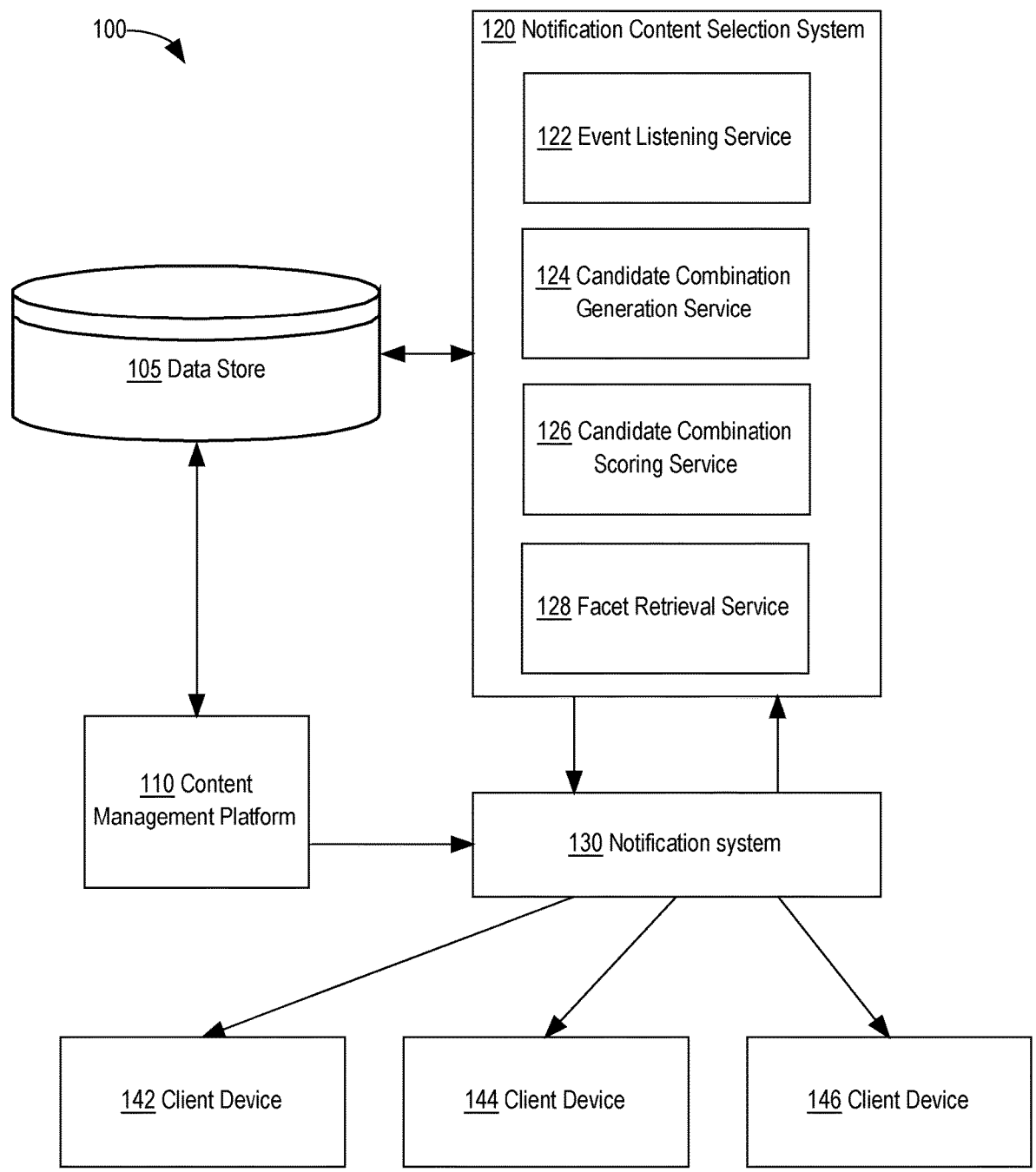
FIG. 1 is a block diagram that depicts a system for generating a notification message containing a headline and call-to-action combination optimized for improved user engagement, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system implements notification systems that generate notification messages for recipient users that inform the recipient users of pending content of interest. Received notification messages may cause users to initiate new user sessions in order to engage with pending content. The pending content may be content published or interacted with by other connected users or may be content that the recipient users are interested in consuming. In an embodiment, a system may identify an event related to a particular user. The event may be based on user interactions by the particular user or may be static events related to the particular user's profile, such as a work anniversary or birthday. The identified event may have a particular notification type that represents a subject type of the event.

Based on the particular notification type of the event, the system may identify a set of candidate headline and call-to-action combinations corresponding to the particular notification type. A headline may refer to content within the notification message that specifies a subject matter of the notification and a reason for generating the notification message. For example, the headline may describe an article shared by the particular user and the reason within the headline may specify that the notification message was generated because the particular user has a relationship to the recipient. A call-to-action may represent an object, such as an action button, that is designed to facilitate an immediate response from the recipient.

The system may implement a machine learned model to calculate scores for each headline and call-to-action combination of the set of candidate headline and call-to-action combinations based upon one or more shared features or interests between the particular user and a recipient user. Scores may represent relevance scores designed to measure the relevance of different headline and call-to-action combinations with respect to a particular performance objective. The system may select one or more particular headline and call-to-action combinations from the set of candidate headline and call-to-action combinations based upon the scores of each of the set of candidate headline and call-to-action combinations. The system may generate a notification message for the event that includes the one or more particular headline and call-to-action combinations. The notification message may be sent to a client device of the recipient.

The disclosed approaches provide advantages over conventional solutions by optimizing notification content of notification messages based upon a machine learned model that scores different headline and call-to-action combinations in order to generate dynamic notification content that is tailored to each recipient based on their relationship to an event caused by a particular user or a relationship to the particular user in order to improve user engagement. The headline included in the notification content describes a reason for generating the notification, which informs the recipient of why the notification was generated. Including explicit reasons for the generating notification content along with presenting dynamic content tailored to the recipient provides increased notification transparency, which in turn may cause increased user engagement. Additionally, dynamic notification content creation may reduce the need to perform additional AB tests for modifying static notification content, which may result in conservation of processing resources and processing time that may be otherwise dedicated to modifying and testing optimization parameters related to notification content creation.

System Overview

FIG. 1 is a block diagram that depicts a system 100 for generating a notification message containing a headline and call-to-action combination optimized for improved user engagement. System 100 may represent a content platform that includes a data store 105, a content management platform 110, a notification content selection system 120, a notification system 130, and client devices 142-146. Although a single content management platform is depicted, system 100 may include additional content management platforms. Similarly, system 100 may include additional notification systems.

In an embodiment, the content management platform 110 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to content items and/or provide the content items to the user. For example, the content management platform 110 may allow a user to consume, upload, search for, approve of (e.g. "like"), dislike, and/or comment on content items.

Examples of a content items may include, but are not limited to, messages, articles, media such as pictures, video, and sound clips, invitations to connect, and any other event or object that may be consumed by a user. A user session may refer to a period of activity between when a user logs into the content platform and the user logs out of the content platform. For example, Jane Smith may initiate a user session by logging into the content platform. Jane Smith may visit several pages, and then end her user session by logging out or by not interacting with the content platform for a period of time.

In an embodiment, the content management platform 110 may track user sessions and store related user session metrics in the data store 105. User session metrics may include, but are not limited to, time and date of the user session, the user who initiated the user session, the duration of the user session, number of actions performed and number of pages visited during the user session, number and type of notifications received by the user, and whether user-sessions were in response to interacting with a received notification message. In an embodiment, the content management platform 110 may also generate user-specific aggregated metrics that describe metrics related to user sessions initiated in response to receiving different notification types, including different combinations of headline content and call-to-action buttons within received notifications. For example, the content management platform 110 may generate aggregated metrics that describe the number of user-sessions and average duration of the user-sessions initiated in response to a particular headline and call-to-action combination in a notification message.

In an embodiment, the data store 105 may represent data storage that stores user session metrics, aggregated user session metrics corresponding to various headline and call-to-action combinations within sent notifications, and headline and call-to-action combinations scored for potential notification messages. User session metrics may include user interaction history of user sessions. The stored data may be accessed by the content management platform 110 and the notification content selection system 120.

In an embodiment, the notification system 130 generates notification messages for users and sends the notification messages to client devices 142-146 for corresponding users. The notification system 130 may receive a request, from the content management platform 110, that identifies one or more users selected to receive a notification. The notification system 130 may request one or more headline and call-to-action combinations from the notification content selection system 120 for generating a notification message to deliver to client devices for the one or more users. The notification system 130 may be enabled to generate various different types of notification messages including, but not limited to, in-application notifications, email notifications, and push notifications.

In an embodiment, client devices 142-146 may represent computing devices including, but not limited to, desktop computers, laptop computers, tablet computers, wearable devices, video game consoles, and smartphones. Client devices 142-146 may represent devices users may use to receive notifications and initiate new user sessions.

Notification Content Selection System

In an embodiment, the notification content selection system 120 may identify user notification content that includes various headline and call-to-action combinations. Each of the identified headline and call-to-action combinations may be assigned a relevance score that represents how relevant a particular headline and call-to-action combination is to a target user. A target user may represent a recipient of a notification message. Relevance scores may be based upon one or more content management platform 110 objectives, such as increasing conversions from notifications, increasing durations of subsequent user sessions, and increasing click-through rates. In an embodiment, the notification content selection service 120 may comprise an event listening service 122, a candidate combination generation service 124, a candidate combination scoring service 126, and a facet retrieval service 128.

Notification Content

A notification is a message received by a target user that contains content related to a source user or actions by a source user. For example, target user A may receive a notification containing content stating that it is source user B's birthday. This example notification contains content directly related to source user B, the source user's birthday. In another example, target user A may receive a notification containing content related to actions performed by source user B. Examples of actions performed by source user B may include sharing content, such as sharing a news article, posting a message, liking or commenting on an article or another user's post.

In an embodiment, a notification content may include a headline and a call-to-action. A headline may represent content within the notification message that specifies a subject matter of the notification and a particular facet identified by the notification content selection system 120. The subject matter may refer to the underlying content for the notification. For instance, if the notification is related to a shared news article, then the subject matter may be the title of the news article and/or a short description of the news article shared by the source user.

A facet refers to a feature that has been identified as a reason why the notification message is presented to the specific target user. In an embodiment, the notification content selection system 120 may identify several features of the source user and target user that describe their relationship. Examples of features may include, but are not limited to, common user profile attributes that suggest a relationship between the source and target user, prior interactions by the target user with content posted by the source user and vice versa, source/target user interaction metrics that suggest the target user will interact with source user content, and any other measurable user interaction data from the source/target user. A facet is a specific feature that may be displayed within the notification content to convey the reason for the notification to the target user. For example, a facet may inform the target user that they are receiving the notification because the target user has previously interacted with the source user's posts. Another example of a facet may be informing the target user that the notification was generated because the source and target user have a common profile attribute, such as employer or attended the same college.

Figure 2:
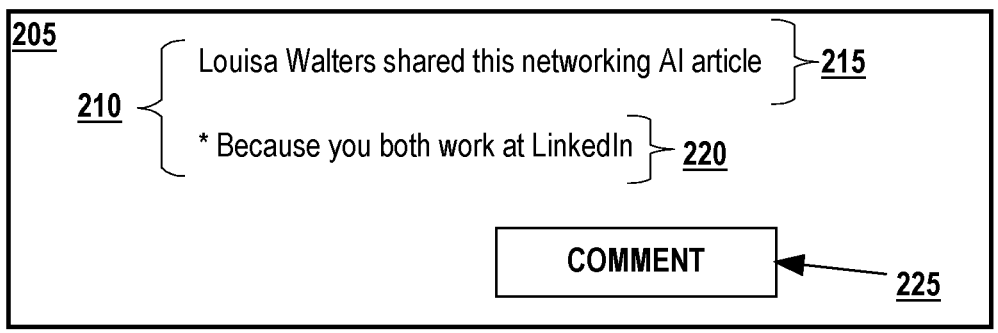
FIG. 2 depicts examples of notification messages that include a headline and a call-to-action, in an embodiment.
Figure 2:
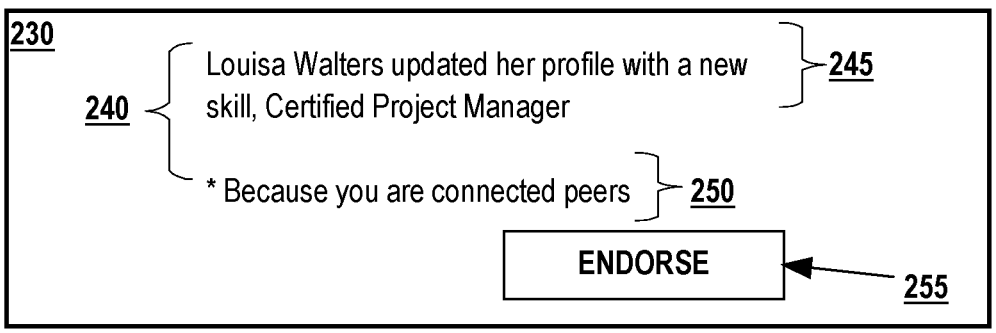

FIG. 2 depicts examples of notification messages that include a headline and a call-to-action. Notification message 205 illustrates a notification to the target user that the source user "Louisa Walters" shared an article entitled "Networking AI" and the notification was received "because you both work at LinkedIn." Headline 210 refers to the content which includes the source user "Louisa Walters shared this article on Networking AI" and has been generated "because you both work at LinkedIn." Subject 215 represents a part of the headline 210 that describes the subject matter of the notification as "Louisa Walters shared this article on Networking AI." Facet 220 represents a part of the headline 210 that describes the reason the notification has been generated. Facet 220 displays the reason for generating the notification as "because you both work at LinkedIn".

Facets may be grouped into facet categories based upon reasons for notifications. For example, facet categories may include, but are not limited to, affinity to member's content, shared user characteristics, affinity to specific topics and/or content, and characteristics of a source user. The affinity to member's content category may include target user's interactions with source user's content such as liking source user comments, clicking on content posted by the source user, and resharing posts by the source user. The shared characteristics category may include user attribute values shared by both the source user and the target user, such as being past or present coworkers, peers, alumni, and being part of the same social or professional group. The affinity to topics or content category corresponds to a relation between the target user and the content that is the subject of the notification. Examples include, the target user is interested in an industry or group related to a post or share by the source user, the target user previously liked or commented on content similar to the content within the notification, or any other relationship between the target user's interests and the subject matter of the source user's action. The source user characteristics category refers to events or milestones related to the source user, such as a birthday, a new job, a work anniversary, and a post made by the source user who has not posted anything for a period of time.

The following table illustrates different notification types, their facet categories, and associated facets:

| Facet Category | Facets |
|---|---|
| Shared by Your Network | |
| Affinity to Member's Content | Prior engagement with source posts: likes, comments, clicks, reshares |
| Shared Characteristics | Coworkers (past, present), peers, alumni, groups |
| Affinity to Topics or Content | Target user follows or is interested in: topic, industry, or hashtag related to source post |
| Source User Characteristics | Birthday, new job, first post in a while, work anniversary |
| Out of Network Notification | |
| Affinity to Content | Target user follows or is interested in: topic, industry, or hashtag related to source post |
| Milestones | |
| Source User Characteristics | Birthday, new job, first post in a while, work anniversary |

Illustrated above are three different notification types, shared by your network, out of network notification, and milestones. The shared by your network may represent notifications caused by actions of users in your network. For example, posts or shares by users that have a first or second degree connection to the target user. The out of network notification type represents notifications related to content and/or topics that the target user is interested in or has previously shown interest in. For example, the target user follows a particular topic or has previously interacted with content related to the particular topic. The milestones notification type represents specific event milestones of the source user, such as a birthday, anniversary, a new job, or a first new post by the source user. In an embodiment, different notification types may share facet categories. For instance, both the shared by your network notification type and the out of network notification type both include the facet category affinity to content.

In an embodiment, the notification message includes a call-to-action object. A call-to-action object is designed to facilitate an immediate response from a recipient. One example of a call-to-action object is an action button, such as a comment button, a say congrats button, a happy anniversary button, a follow button to follow the source user, an endorse button to endorse the source user, and any other programmable action that may be displayed as an action button. Other examples of call-to-action objects may include various types of actions buttons that navigate to specific content items, users, or user groups for viewing by the target user. For instance, the call-to-action object may be a view button that initiates a new user session and automatically navigates to the article, user post, source user profile page, or user group associated with the headline in the notification message. Referring to FIG. 2 the notification message 205 contains comment button 225 that represents an action button, which when pressed by the target user, initiates a user session and prompts the target user to comment on the article shared by the source user, Louisa Walters.

In an embodiment, notification message 230 illustrates another example of notification content containing headline 240 and endorse button 255, which represents the call-to-action. Headline 240 contains subject 245 which displays that Louisa Walters "updated her profile with a new skill, Certified Project Manager," and facet 250 which displays the reason for the notification to the target user as "because you are peers." The endorse button 255 represents the call-to-action and, when pressed by the target user, initiates a user session and prompts the target user to endorse one or more of Louisa Walters's (source user) skills.

Event Listening Service

In an embodiment, the event listening service 122 listens for events that may trigger generation of a notification message. Events may refer to specific user actions, such as likes, comments, or shared content within a user session. For example, if a source user, within a user session, shares a news article, then the event listening service 122 may identify the sharing of the news article by the source user. In another example, if the event is a user profile update for a new job, then the event listening service 122 may identify the profile update as an event for notification message generation.

In an embodiment, the event listening service 122 may identify offline events related to the source user that may trigger a notification message. Offline events may refer to events that may be identified in advance, such as birthdays and work anniversaries. The event listening service 122 may query user profiles, stored within the data store 105, to determine which users have an upcoming birthday or work anniversary. Events may be marked for generating a notification message based on the upcoming birthday/work anniversary.

In an embodiment, the event listening service 122, upon identifying an event, may determine a notification type associated with the event. For example, if the event is a work anniversary, then the event listening service 122 may determine that the event has a milestone notification type. Different notification types may have unique sets of headline and call-to-action combinations. For instance, a milestone notification type may include headline and call-to-action combinations that include the call-to-action button "Say Congrats." The notification type may be based upon historical events and their corresponding notification messages. For example, if the event identified is a work anniversary, then the event listening service 122 may determine based upon previous work anniversary events and the corresponding notification messages generated, that work anniversary events are milestone notification types.

In an embodiment, the event listening service 122 may retrieve, from the data store 105, a set of headline and call-to-action combinations that correspond to the determined notification type. The data store 105 may contain a plurality of candidate headline and call-to-action combinations for displaying notification content within a notification message. Not all headline and call-to-action combinations may be appropriate for each notification type. For instance, headline and call-to-action combinations that include the call-to-action "connect" may not be appropriate for the milestone notification type (e.g. birthday or work anniversary) because the source user who reached the birthday or work anniversary milestone is likely already connected to the target user and the "connect" call-to-action would not be needed. The data store 105 may store various sets of headline and call-to-action combinations appropriate for each notification type.

In an embodiment, the set of headline and call-to-action combinations retrieved by the event listening service 122 may include a set of relevant features that may factor into selecting the headline and call-to-action combination. For example, the candidate combination scoring service 126 calculates relevance scores for each headline and call-to-action combination for each source and target user pair based upon one or more features associated with the source and target users. Determining which features to incorporate into the relevance score calculation may be based upon the set of relevant features associated with the set of headline and call-to-action combinations retrieved by the event listening service 122.

Candidate Combination Generation Service

In an embodiment, the candidate combination generation service 124 analyzes the content associated with the identified event and the source user's connections to determine a set of target users for receiving a notification message of the identified event. The set of target users may include users connected to the source user and users that are interested in topics related to the subject matter of the event, which may include users that are not connected to the source user. The candidate combination generation service 124 associates the set of headline and call-to-action combinations to each target user in the set of target users identified. In some instances the set of headline and call-to-action combinations for each target user may differ. For example, if a first target user is interested in the topic related to the content item, then the headline and call-to-actions combinations for the first target user may include call-to-action buttons that include "follow user", "follow topic", or "connect" (if the target user is not connected to the source user) to the source user. In another example, if a second target user is directly connected to the source user, then the headline and call-to-actions combinations for the second target user may include a "like" button, a "comment" button, a "share" button, and a "follow topic" button.

In an embodiment, the candidate combination generation service 124, upon generating the sets of headline and call-to-action combinations for the target users, may send the list of target users and corresponding sets of headline and call-to-action combinations to the candidate combination scoring service 126 for calculating relevance scores for each of the headline and call-to-action combinations for each target user.

Candidate Combination Scoring Service

In an embodiment, the candidate combination scoring service 126 may implement a machine-learned model for calculating relevance scores for each of the headline and call-to-action combinations for each identified target user. Any of a variety of prediction models may be implemented. Example prediction models may include a binary classification model, a logistic regression model, a multiclass classification model, a multinomial logistic regression model, and/or a linear regression model.

In an embodiment, training data for the machine-learned model may be retrieved from the data store 105. Training data may be generated from user interaction feedback data collected in response to various headline and call-to-action combinations included in notification messages sent to target users over a period of time. The training data may include data and label data. The data may specify a source user event that caused generation of a notification message, source user and target user feature data including cross feature values that represent common feature values between the source and target user, headline and call-to-action combinations presented within the notification messages, and user interaction data specifying target user actions upon receiving the notification message. The label data may include metrics corresponding to the one or more objectives that may include values, such as a 1 representing that the target user clicked the call-to-action button in the notification message and a 0 representing that the target user did not click on the call-to-action button in the notification message. Other examples of metrics corresponding to the one or more objectives includes values describing the length of user session duration that resulted from the click of the notification message and user interaction data describing whether subsequent user session clicks during the subsequent user session occurred.

In an embodiment, the source and target user feature data may refer to various profile attributes as well as observed user interaction behavior. For example, user profile attributes may include attributes such as employment history, education history, skills, interests, place of residence, and any other profile attribute available. Cross feature values refer to identical feature values of the source user and the target user for a particular feature. For example, a cross feature current employer value that equals '1' would be a cross feature value if both the source user and the target user listed the same employer in their respective profiles.

Machine learning techniques train the machine-learned model using the training data to learn different weight values with each feature identified. In an embodiment, the machine-learned model may represent an algorithm for calculating relevance scores for each headline and call-to-action combination, where each feature has an associated weight value. The machine-learned model may receive, as input, feature values associated with the source user and the target user, such as user profile attribute values describing past and present employers, education history, and user interaction behaviors, the source user event and event type that is the subject of the notification, and the specific headline and call-to-action combination to be scored. The output of the machine-learned model is a relevance score for the headline and call-to-action combination. In an embodiment, the relevance score may represent an estimated performance with respect to a particular objective. For example, if the machine-learned model algorithm is tuned for increasing click-through rates of notifications, then the relevance score may represent an estimated click-through rate performance of (or a probability of a target user clicking on) a particular notification (that includes a particular headline and call-to-action combination) sent to the target user. In another example, if the machine-learned model algorithm is tuned for maximizing user session duration, then the relevance score may represent an estimated user session duration value or a probability that a user will initiate a user session for a given period of time if a particular notification is sent to the target user.

In an embodiment, the candidate combination scoring service 126 may store the plurality of datasets within the data store 105. For example, the candidate combination scoring service 126 may store a first plurality of objects that each contain a headline and call-to-action combination ID and its associated relevance score. The candidate combination scoring service 126 may store a second plurality of objects that each contain a headline and call-to-action combination ID and event specific content for the specific headline and call-to-action combination. For instance, the headline and call-to-action combination ID may be 101 with a relevance score of 90 out of a 100. The event specific content for headline and call-to-action ID 101 may be a headline that states "Louisa Walters shared a Networking AI article, you are seeing this because you both work at LinkedIn" and a "comment" call-to-action button.

Facet Retrieval Service

In an embodiment, the facet retrieval service 128 receives a request for one or more headline and call-to-action combinations from the notification system 130 for a specific target user and retrieves headline and call-to-action combination ID and associated score from the data store 105. For example, the notification system 130 may send a request, for headline and call-to-action combination IDs and scores for a particular target user, to the facet retrieval service 128. The facet retrieval service 128 may query the data store 105 to retrieve a list of the headline and call-to-action combination IDs and scores for the particular target user. The facet retrieval service 128 may send the list of the headline and call-to-action combination IDs and scores to the notification system 130.

In an embodiment, the notification system 130, upon determining which headline and call-to-action combinations to include with the notification message, may send a second request that includes one or more specific headline and call-to-action combination IDs, for retrieving details of the one or more specific headline and call-to-action combinations. For example, if the notification system 130 requests notification content for an in-application notification, which may only present one headline and call-to-action combination, then the notification system's 130 request may specify the top scoring headline and call-to-action combination ID in the request. The facet retrieval service 128 may retrieve the specific headline and call-to-action combination details for the provided headline and call-to-action ID from the data store 105 and send the details to the notification system 130 in order to generate the notification message.

In another example, the notification system 130 may request details for multiple headline and call-to-action combinations, such as the top five scoring combinations. Multiple headline and call-to-action combinations may be requested when the notification message is an email notification. The facet retrieval service 128 may retrieve the specific headline and call-to-action combination details for the provided headline and call-to-action combination IDs (top five IDs) from the data store 105 and send the details to the notification service 130 in order to generate the notification message that includes the details corresponding to the top five combination IDs.

Processing Overview

Figure 3:
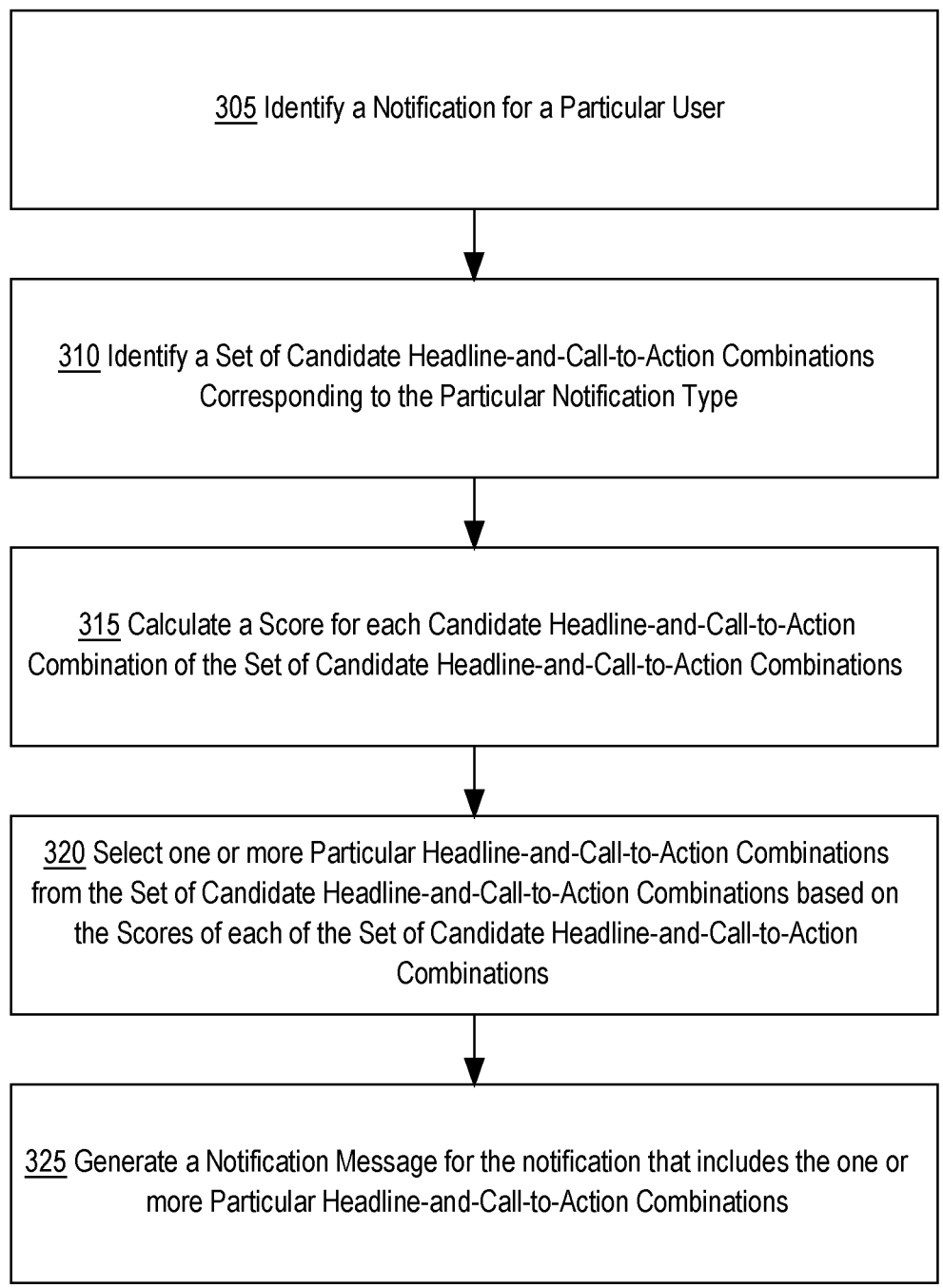
FIG. 3 is a flowchart that depicts a process for identifying, scoring, and selecting one or more headline and call-to-action combinations for generating a notification message for delivery to a client device, in an embodiment.

FIG. 3 depicts an example flowchart for identifying, scoring, and selecting one or more headline and call-to-action combinations for generating a notification message for delivery to a client device. Process 300 may be performed by a single program of multiple programs. The operations of the process as shown in FIG. 3 may be implemented using processor-executable instructions that are stored in computer memory. For purposes of providing a clear example, the operations of FIG. 3 are described as performed by components of system 100. For the purposes of clarity process 300 is described in terms of a single entity.

In operation 305, process 300 identifies an event related to a particular user. In an embodiment, the event listening service 122 identifies an event by the particular user (source user) that may represent a notification for other users (target users). The event listening service 122 may identify online events, which may represent actions performed by the source user during a user session. Examples of online events may include when a source user shares content or likes or comments on other user's posts. The event listening service 122 may also identify offline events, which may represent upcoming user milestones, such as an upcoming birthday or anniversary. In an embodiment, the event listening service 122 identifies a particular notification type for the event identified. The notification type may be based upon similar historical events identified and the corresponding notification messages generated for those events. <<Inventors, can an event be associated with multiple notification types? For example, can an event be associated with both SBYN and a Milestone?>>

In operation 310, process 300 identifies a set of candidate headline and call-to-action combinations corresponding to the particular notification type. In an embodiment, the event listening service 122 identifies a set of candidate headline and call-to-action combinations corresponding to the particular notification type by retrieving from the data store 105, the set of candidate headline and call-to-action combinations that correspond to the determined notification type. For example, if the determined notification type is shared by your network, then the event listening service 122 may generate a headline and call-to-action query for candidate headline and call-to-action combinations for the shared by your network notification type.

In an embodiment, upon retrieving the set of candidate and call-to-action combinations, the candidate combination generation service 124 may determine a set of target users based upon the source user and the notification type of the event. The set of target users may include users connected to the source user, such as first and second degree connections and may include other users not directly connected to the source user but have interest in the content of the event. For example, if the event is a share of an article on networking AI, then the candidate combination generation service 124 may determine target users that follow or are interested in networking AI. The candidate combination generation service 124 may generate sets of candidate headline and call-to-action combinations for each target user identified.

In operation 315, process 300 calculates a score for each candidate headline and call-to-action combination in the set of candidate headline and call-to-action combinations. In an embodiment, the candidate combination scoring service 126 may iterate through each target user of the set of target users identified the candidate combination scoring service 126 and calculate a relevance score for each of the headline and call-to-action combination using the machine-learned model. In an embodiment, the machine-learned model may receive, as input, features associated with the source user and the target user, the user event that is the subject of the notification, and the specific headline and call-to-action combination to be scored. Features may refer to user profile and user interaction feature values for the source and target user. For example, user profile feature values may include values for attributes such as employment history, education history, skills, interests, place of residence, and any other profile attribute available. User behavior feature values may include values for user interactions such as user session duration, frequency in which a user initiates a user session in response to viewing a notification, and any other user action performed during a user session. The output of the machine-learned model is a relevance score for the headline and call-to-action combination provided as input for the target user.

In an embodiment, the candidate combination scoring service 126 may store the dataset of relevance scores and headline and call-to-action combinations for each target user, in the set of target users, within the data store 105. The candidate combination scoring service 126 may store a first plurality of objects, each of which contains a headline and call-to-action combination ID and its associated relevance score and a second plurality of objects, each of which contains a headline and call-to-action combination ID and event specific content for the specific headline and call-to-action combination. For example, the data store 105 may contain a database table enabled to store headline and call-to-action combination IDs in one column and the associated relevance scores in another column. The data store 105 may contain another database table enabled to store the headline and call-to-action combination IDs in one column and the event specific content in another column. In other examples, the data store 105 may store the headline and call-to-action combination ID, associated relevance scores, and event specific content using any commercially available relational or object database or any other data object storage technique.

In an embodiment, the candidate combination scoring service 126 may calculate and store relevance scores for multiple events for a target user within the data store 105. At any point in time the facet retrieval service may retrieve headline and call-to-action combinations for multiple difference notifications for the particular target user.

In operation 320, process 300 selects one or more particular headline and call-to-action combinations from the set of candidate headline and call-to-action combinations based on the scores of each combination in the set of candidate headline and call-to-action combinations. In an embodiment, the notification system 130 may receive a request to generate one or more notifications for a particular target user from the content management platform 110. The notification system 130 may request, from the facet retrieval service 128, the set of candidate headline and call-to-action combinations, including the corresponding relevance scores, for a particular target user. The facet retrieval service 128 receives the request for the particular target user and retrieves the set of candidate headline and call-to-action combinations and corresponding relevance scores from the data store 105. For example, the facet retrieval service 128 may retrieve the IDs and relevance scores for the set of candidate headline and call-to-action combinations. The facet retrieval service 128 may send the retrieved IDs and relevance scores for the set of candidate headline and call-to-action combinations to the notification system 130.

In an embodiment, the notification system 130 may determine, based on the request from the content management system 110, the delivery method for the notification message to be generated and a number of headline and call-to-action combinations to retrieve from the facet retrieval service 128 for the notification message. For example, if the request from the content management system 110 specifies that an in-app notification message is to be delivered to the target user, then the notification service 130 may determine that only one headline and call-to-action combination is needed for the in-app notification message. In another example, if the request from the content management system 100 specifies that an email notification is to be delivered, then the notification service 130 may determine that multiple notifications and their corresponding headline and call-to-action combinations may be displayed within the email message.

In an embodiment, the notification system 130 may request specific headline and call-to-action combination details for corresponding headline and call-to-action combination IDs previously provided by the facet retrieval service 128. The notification system 130 may select one or more headline and call-to-action combinations for notifications based upon the highest relevance scores and compatibility with the delivery method for the notification. For example, of if the delivery method for a single notification is an in-app notification, then the notification system 130 may request the combination that has the highest relevance score. If, however, the combination with the highest relevance score is not compatible with in-app notifications, then the notification system 130 may specify, with the request, the headline and call-to-action combination ID for the second highest relevance score, provided that the second highest relevance score is compatible with in-app notifications. Compatibility may be based on whether the headline and corresponding call-to-action button is able to be presented within an in-app notification.

In an example where the notification delivery method is via email notification, then the notification system 130 may request from the facet retrieval service 128 the top five highest relevance scored headline and call-to-action combinations for pending notifications for the target user. If the top five highest relevance scored headline and call-to-action combinations all refer to the same notification, then the notification system 130 may request, using headline and call-to-action combination IDs, the top five highest relevance scored headline and call-to-action combinations for five unique pending notifications. For instance, if the first five scores correspond to notification A and the $6^{th}$ through $9^{th}$ scores each refer to other unique notifications, then the notification system 130 may request details for the top scoring combinations for notification A and the $6^{th}$ through $9^{th}$ scores each referring to four other unique notifications.

In operation 325, process 300 generates a notification message for the event that includes one or more particular headline and call-to-action combinations. In an embodiment, the notification system 130, in response to receiving the one or more particular headline and call-to-action combination details, generates a notification message for the target user based upon the determined delivery method and the combination details. For example, if the delivery method is an in-app notification and the combination details specify a headline of "Louisa Walters shared a Networking AI article, you are receiving this because you both work at LinkedIn" and a call-to-action of a comment button, then the notification system 130 may generate an in-app notification for the target user with the headline of "Louisa Walters shared a Networking AI article, you are receiving this because you both work at LinkedIn" and a call-to-action comment button. Referring to FIG. 2, notification message 205 illustrates one such notification with headline 210 stating "Louisa Walters shared a Networking AI article, you are receiving this because you both work at LinkedIn" and the comment button 225 as the call-to-action. In an embodiment, the notification system may deliver the generated notification message to client device 142, which may represent a client device for the target user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
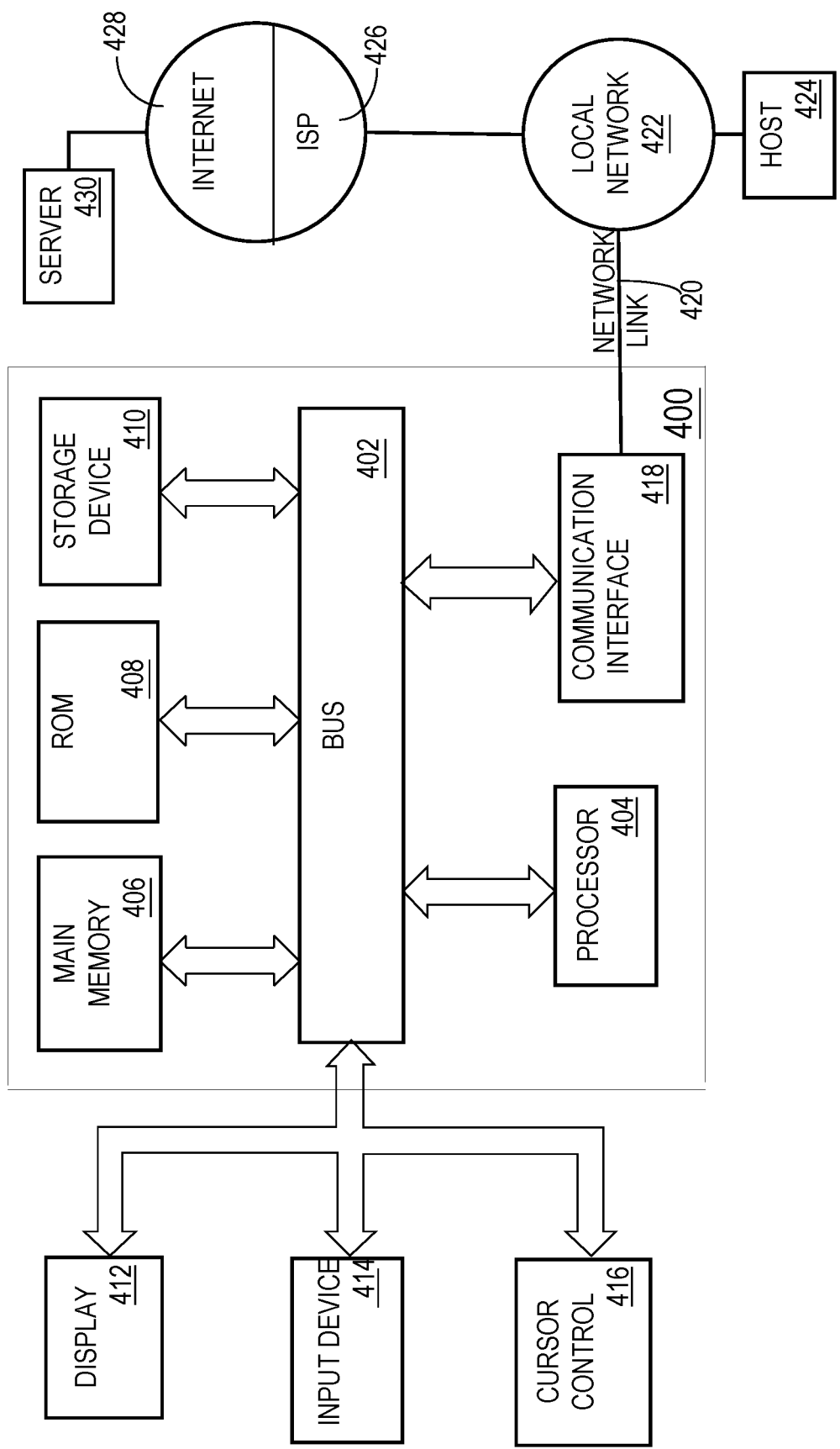
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   identifying an event related to a source user;
   determining a subject type of the event;
   determining a notification type that represents the subject type;
   determining a first score for the source user and a target user;
   based on the notification type and the first score, identifying a set of candidate headline and call-to-action combinations corresponding to the particular notification type and the target user;
   wherein the set of candidate headline and call-to-action combinations includes at least a first headline and call-to-action combination that comprises a first action button and a second headline and call-to-action combination that comprises a second action button different from the first action button;
   using a machine learned model, calculating a second score for each headline and call-to-action combination of the set of candidate headline and call-to-action combinations and the target user;
   selecting one or more particular headline and call-to-action combinations from the set of candidate headline and call-to-action combinations based on the second score;
   wherein the selected one or more particular headline and call-to-action combinations comprises one of the first action button or the second action button; and
   generating a notification message for the target user about the event;
   wherein the notification message includes the one or more selected particular headline and call-to-action combinations.

2. The computer-implemented method of claim 1, wherein identifying the set of candidate headline and call-to-action combinations, comprises:
   determining a plurality of candidate headline and call-to-action combinations; and
   identifying the set of candidate headline and call-to-action combinations from the plurality of candidate headline and call-to-action combinations based upon at least one of historical user interaction data associated with historical headline and call-to-action combinations within notification messages previously presented to users, or the historical headline and call-to-action combinations previously associated with the particular notification type of the notification.

3. The computer-implemented method of claim 1, wherein calculating scores for each headline and call-to-action combination of the set of candidate headline and call-to-action combinations, comprises:
for each headline and call-to-action combination of the set of candidate headline and call-to-action combinations, calculating a score for said headline and call-to-action combination that represents an estimated performance, with respect to an objective, of a notification that includes said headline and call-to-action combination, wherein the estimated performance corresponds to at least one of a click through rate or a user session duration in response to receiving the notification.

4. The computer-implemented method of claim 1, further comprising:
training the machine learned model by:
using received historical user interaction data that includes user session interactions of users in response to receiving a plurality of notifications that comprises different combinations of a plurality of headline and call-to-action combinations and user profile feature data; and
wherein the plurality of notifications comprises headline and call-to-action combinations used for the plurality of notifications.

5. The computer-implemented method of claim 4, wherein the user profile feature data comprises user attribute values of at least one of: a current employer, one or more past employers, an education history, one or more skills, one or more interests, a current place of residence, one or more past places of residence, or one or more memberships to groups.

6. The computer-implemented method of claim 1, wherein selecting the one or more particular headline and call-to-action combinations, comprises:
determining a delivery method for the notification for the source user; and
upon determining that the delivery method for the notification is via an in-application notification, selecting a particular headline and call-to-action combination that has a highest score and is compatible for presentation via the in-application notification.

7. The computer-implemented method of claim 6, wherein selecting the one or more particular headline and call-to-action combinations further comprises upon determining that the delivery method for the notification is via an email notification, selecting two or more headline and call-to-action combinations that have highest scores and are compatible for presentation via the email notification.

8. The computer-implemented method of claim 1, wherein the set of candidate headline and call-to-action combinations comprises:
unique combinations of a set of headlines and a set of call-to-actions;
wherein each headline in the set of headlines represents a description of a feature that describes a relationship between a user receiving the notification message and the source user that triggered generation of the notification message; and
wherein each call-to-action in the set of call-to-actions represents an action, presented to the user, that the user may invoke in response to viewing the notification message.

9. A computer program product comprising:
one or more non-transitory computer-readable storage media comprising instructions which, when executed by one or more processors, cause:
identifying an event related to a source user;
determining subject type of the event;
determining a notification type that represents the subject type;
determining a first score for the source user and a target user;
based on the notification type and the first score, identifying a set of candidate headline and call-to-action combinations corresponding to the particular notification type and the target user;
wherein the set of candidate headline and call-to-action combinations includes at least a first headline and call-to-action combination that comprises a first action button and a second headline and call-to-action combination that comprises a second action button different from the first action button;
using a machine learned model, calculating a second score for each headline and call-to-action combination of the set of candidate headline and call-to-action combinations and the target user;
selecting one or more particular headline and call-to-action combinations from the set of candidate headline and call-to-action combinations based on the second score;
wherein the selected one or more particular headline and call-to-action combinations comprises one of the first action button or the second action button; and
generating a notification message for the target user about the event;
wherein the notification message includes the one or more selected particular headline and call-to-action combinations.

10. The computer program product of claim 9, wherein identifying the set of candidate headline and call-to-action combinations, comprises:
determining a plurality of candidate headline and call-to-action combinations; and
identifying the set of candidate headline and call-to-action combinations from the plurality of candidate headline and call-to-action combinations based upon at least one of historical user interaction data associated with historical headline and call-to-action combinations within notification messages previously presented to users or the historical headline and call-to-action combinations previously associated with the particular notification type of the notification.

11. The computer program product of claim 9, wherein calculating scores for each headline and call-to-action combination of the set of candidate headline and call-to-action combinations, comprises:
for each headline and call-to-action combination of the set of candidate headline and call-to-action combinations, calculating a score for said headline and call-to-action combination that represents an estimated performance, with respect to an objective, of a notification that includes said headline and call-to-action combination, wherein the estimated performance corresponds to at least one of a click through rate or a user session duration in response to receiving the notification.

12. The computer program product of claim 9, wherein the one or more non-transitory computer-readable storage media comprises further instructions which, when executed by the one or more processors, cause:

training the machine learned model by:
  using received historical user interaction data that includes user session interactions of users in response to receiving a plurality of notifications that comprises different combinations of a plurality of headline and call-to-action combinations and user profile feature data; and
  wherein the plurality of notifications comprises headline and call-to-action combinations used for the plurality of notifications.

13. The computer program product of claim 12, wherein the user profile feature data comprises user attribute values of at least one of: a current employer, one or more past employers, an education history, one or more skills, one or more interests, a current place of residence, one or more past places of residence, or one or more memberships to groups.

14. The computer program product of claim 9, wherein selecting the one or more particular headline and call-to-action combinations comprises:
  determining a delivery method for the notification for the source user; and
  upon determining that the delivery method for the notification is via an in-application notification, selecting a particular headline and call-to-action combination that has a highest score and is compatible for presentation via the in-application notification.

15. The computer program product of claim 14, wherein selecting the one or more particular headline and call-to-action combinations further comprises upon determining that the delivery method for the notification is via an email notification, selecting two or more headline and call-to-action combinations that have highest scores and are compatible for presentation via the email notification.

16. The computer program product of claim 9, wherein the set of candidate headline and call-to-action combinations comprises:
  unique combinations of a set of headlines and a set of call-to-actions;
  wherein each headline in the set of headlines represents a description of a feature that describes a relationship between a user receiving the notification message and the source user that triggered generation of the notification message; and
  wherein each call-to-action in the set of call-to-actions represents an action, presented to the user, that the user may invoke in response to viewing the notification message.

17. A system, comprising:
  one or more computer program processors;
  one or more non-transitory computer readable media coupled to the one or more processors and storing instructions, wherein the one or more computer program processors, when executing the instructions, performs operations comprising:
  identifying an event related to a source user;
  determining a subject type of the event;
  determining a notification type that represents the subject type of the event;
  determining a first score for the source user and a target user;
  based on the notification type and the first score, identifying a set of candidate headline and call-to-action combinations corresponding to the particular notification type and the target user;
  wherein the set of candidate headline and call-to-action combinations includes at least a first headline and call-to-action combination that comprises a first action button and a second headline and call-to-action combination that comprises a second action button different from the first action button;
  using a machine learned model, calculating a second score for each headline and call-to-action combination of the set of candidate headline and call-to-action combinations and the target user;
  selecting one or more particular headline and call-to-action combinations from the set of candidate headline and call-to-action combinations based on the second score;
  wherein the selected one or more particular headline and call-to-action combinations comprises one of the first action button or the second action button; and
  generating a notification message for the target user about the event;
  wherein the notification message includes the one or more selected particular headline and call-to-action combinations.

18. The system of claim 17, wherein identifying the set of candidate headline and call-to-action combinations comprises:
  determining a plurality of candidate headline and call-to-action combinations; and
  identifying the set of candidate headline and call-to-action combinations from the plurality of candidate headline and call-to-action combinations based upon at least one of historical user interaction data associated with historical headline and call-to-action combinations within notification messages previously presented to users or the historical headline and call-to-action combinations previously associated with the particular notification type of the notification.

19. The system of claim 17, wherein calculating scores for each headline and call-to-action combination of the set of candidate headline and call-to-action combinations, comprises:
  for each headline and call-to-action combination of the set of candidate headline and call-to-action combinations, calculating a score for said headline and call-to-action combination that represents an estimated performance, with respect to an objective, of a notification that includes said headline and call-to-action combination, wherein the estimated performance corresponds to at least one of a click through rate or a user session duration in response to receiving the notification.

20. The system of claim 17, wherein the notification system performs further operations comprising:
  training the machine learned model by:
    using received historical user interaction data that includes user session interactions of users in response to receiving a plurality of notifications that comprises different combinations of a plurality of headline and call-to-action combinations and user profile feature data; and
    wherein the plurality of notifications comprises headline and call-to-action combinations used for the plurality of notifications.

* * * * *